US007599349B2

United States Patent
Vasseur et al.

(10) Patent No.: US 7,599,349 B2
(45) Date of Patent: Oct. 6, 2009

(54) COMPUTING INTER-AUTONOMOUS SYSTEM MPLS TRAFFIC ENGINEERING LSP PATHS

(75) Inventors: Jean Philippe Vasseur, Dunstable, MA (US); Muthurajah Sivabalan, Kanata (CA); Anca Zamfir, Kanata (CA); Carol Iturralde, Framingham, MA (US)

(73) Assignee: Cisco Technology, Inc., San Jose, CA (US)

(*) Notice: Subject to any disclaimer, the term of this patent is extended or adjusted under 35 U.S.C. 154(b) by 886 days.

(21) Appl. No.: 10/767,574

(22) Filed: Jan. 29, 2004

(65) Prior Publication Data
US 2006/0039391 A1 Feb. 23, 2006

(51) Int. Cl.
*H04L 12/28* (2006.01)
*H04L 12/56* (2006.01)

(52) U.S. Cl. .................. 370/351; 370/400; 370/401

(58) Field of Classification Search .............. 370/254, 370/256, 351, 389, 395.5, 395.52
See application file for complete search history.

(56) References Cited

U.S. PATENT DOCUMENTS

| 6,993,593 | B2 * | 1/2006 | Iwata ................... 709/238 |
| 7,126,944 | B2 * | 10/2006 | Rangarajan et al. ....... 370/389 |
| 7,184,434 | B2 * | 2/2007 | Ganti et al. ............. 370/389 |
| 7,200,120 | B1 * | 4/2007 | Greenberg et al. ........ 370/254 |
| 7,215,644 | B2 * | 5/2007 | Wu et al. ............... 370/248 |
| 7,283,477 | B1 * | 10/2007 | Fedyk et al. ............ 370/237 |
| 2004/0190517 | A1 * | 9/2004 | Gupta et al. ............ 370/392 |
| 2005/0152333 | A1 * | 7/2005 | Smith .................. 370/351 |
| 2007/0165546 | A1 * | 7/2007 | Greenberg et al. ........ 370/254 |

OTHER PUBLICATIONS

Awduche et al., "Requirements for Traffic Engineering Over MPLS", RFC 2702, Internet Engineering Task Force, Sep. 1999.
Berger et al., Generalized MPLS Signalinig—RSVP-TE Extensions, RFC 3473, Internet Engineering Task Force, Jan. 2003.
Braden et al., Resouce ReSerVation Protocol (RSVP)—Version 1 Functional Specification, RFC 2205, Internet Engineering Task Force, Sep. 1997.
Lindem et al., "Extensions to OSPF for Advertising Optional Router Capabilities", Internet Draft, Internet Engineering Task Force, Oct. 2003.
Rosen et al., "Multiprotocol Label Switching Architecture", RFC 3031, Internet Engineering Task Force, Jan. 2001.
Vasseur et al., "OSPF Traffic Engineering Capability TLVs", Internet Draft, Internet Engineering Task Force, Oct. 2002.
Vasseur et al., "RSVP Path Computation Request and Reply Messages", Internet Draft, Internet Engineering Task Force, Jun. 2002.

* cited by examiner

*Primary Examiner*—Ayaz R Sheikh
*Assistant Examiner*—Blanche Wong
(74) *Attorney, Agent, or Firm*—Cindy Kaplan

(57) ABSTRACT

Systems and methods for computing the paths of MPLS Traffic Engineering LSPs across Autonomous System and/or area boundaries. A distributed path computation algorithm exploits multiple path computation elements (PCEs) to develop a virtual shortest path tree (VSPT) resulting in computation of an end-to-end optimal (shortest) path. In some implementations, the VSPT is computed recursively across all the Autonomous Systems and/or areas between the head-end and tail-end of the Traffic Engineering LSP.

56 Claims, 7 Drawing Sheets

COMPUTING INTER-AUTONOMOUS SYSTEM MPLS TRAFFIC ENGINEERING LSP PATHS

BACKGROUND OF THE INVENTION

The present invention relates to data networking and more particularly to path computation in certain types of situation.

MPLS (Multi-Protocol Label Switching) Traffic Engineering has been developed to meet data networking requirements such as guaranteed available bandwidth. MPLS Traffic Engineering exploits modem label switching techniques to build guaranteed bandwidth end-to-end tunnels through an IP/MPLS network of labels switched routers (LSRs). These tunnels are a type of label switched path (LSP) and thus are generally referred to as MPLS Traffic Engineering LSPs.

Establishment of an MPLS Traffic Engineering LSP from an LSP head-end to an LSP tail-end involves computation of a path through the network of LSRs. Optimally, the computed path is the "shortest" path, as measured in some metric, that satisfies all of the relevant constraints such as e.g., required bandwidth, availability of backup bypass tunnels for each link and node included in the path, etc. Path computation can either be performed by the head-end LSR or by some other entity operating as a path computation element (PCE). The head-end (or PCE) exploits its knowledge of network topology and resources available on each link to perform the path computation according to the LSP Traffic Engineering constraints. Various path computation methodologies are available including CSPF (constrained shortest path first).

Up until now, MPLS Traffic Engineering LSPs have been configured within a single Autonomous System (AS) or Interior Gateway Protocol (IGP) area. The term "Autonomous System" generally refers to a group of routers within a network that are subject to a common authority and use the same intradomain routing protocol. It is now desirable to extend MPLS Traffic Engineering LSPs across AS boundaries. This would greatly improve traffic management and quality of service across multiple service providers over what has been achieved using prior art Border Gateway Protocol (BGP)-based techniques.

One difficulty that arises in achieving this goal is that path computation at the LSP head-end requires knowledge of network topology and resources across the entire network between the head-end and the tail-end. Yet service providers typically do not share this information with each other across AS borders. Neither the head-end nor any PCS will have sufficient knowledge to compute a path. Prior art MPLS Traffic Engineering path computation methodologies thus do not operate in an inter-AS context.

A similar problem arises in computing the paths of MPLS Traffic Engineering LSPs across what are referred to as "areas." An area is a collection of routers that share full network topology information with each other. To improve routing scalability, a service provider may divide an AS into multiple areas. Network topology and resource information do not, however, flow across area boundaries even though a single service provider may operate all the IGP areas. Like in the inter-AS case, the standard MPLS Traffic Engineering path computation techniques cannot compute inter-area paths because overall network topology and resource information may not be available at any one node.

What is needed are systems and methods for computing the paths of MPLS Traffic Engineering LSPs across area and/or AS boundaries.

SUMMARY OF THE INVENTION

Embodiments of the present invention provide systems and methods for computing the paths of MPLS Traffic Engineering LSPs across Autonomous System and/or area boundaries. A distributed path computation algorithm exploits multiple path computation elements (PCEs) to develop a virtual shortest path tree (VSPT) resulting in computation of an end-to-end optimal (shortest) path. In some implementations, the VSPT is computed recursively across all the Autonomous Systems and/or areas between the head-end and tail-end of the Traffic Engineering LSP.

Further understanding of the nature and advantages of the inventions herein may be realized by reference to the remaining portions of the specification and the attached drawings.

DESCRIPTION OF SPECIFIC EMBODIMENTS

Figure 1:
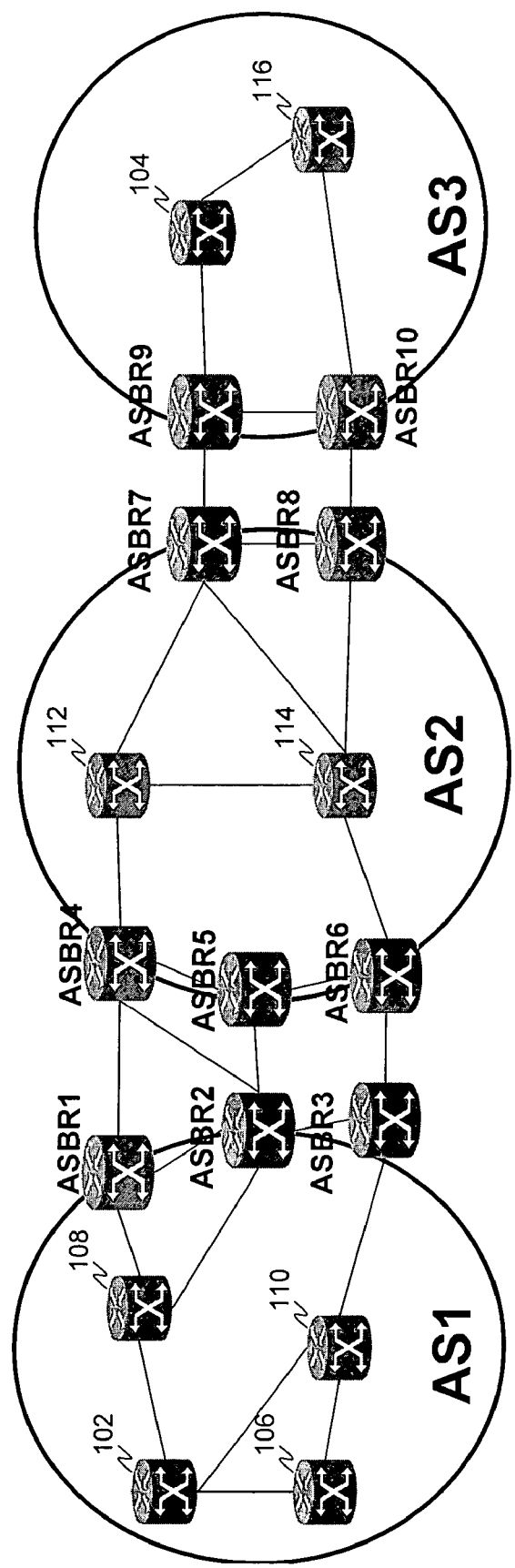
FIG. 1 depicts an inter-Autonomous System path computation scenario according to one embodiment of the present invention.

The present invention will be described with reference to a representative network environment and employs a certain combination of network protocols to forward data through the network. The links may be implemented using any type of physical medium such as, e.g., an optical medium, wireless medium, twisted pair, etc. Links may also be logical connections that give the connected nodes the property of adjacency in view of the operative networking protocols.

In one embodiment, the nodes of such a network interoperate in a manner specified by various protocols including e.g., TCP/IP and protocols defined but not limited to by the following documents:

E. Rosen, et al., "Multiprotocol Label Switching Architecture," RFC 3031, Internet Engineering Task Force, January 2001.

Braden, et al. "Resource ReSerVation Protocol (RSVP)-Version 1 Functional Specification," RFC 2205, Internet Engineering Task Force, September 1997.

Awduche, et al., "Requirements for Traffic Engineering Over MPLS," RFC 2702, Internet Engineering Task Force, September 1999.

Berger, et al., "Generalized MPLS Signaling—RSVP-TE Extensions," RFC 3473, Internet Engineering Task Force, January 2003.

Vasseur, et al. "RSVP Path Computation Request and Reply Messages," Internet Draft, Internet Engineering Task Force, June 2002.

Lindem, et al., "Extensions to OSPF for Advertising Optional Router Capabilities," Internet Draft, Internet Engineering Task Force, October 2003.

Vasseur, et al., "OSPF Traffic Engineering Capability TLVs," Internet Draft, Internet Engineering Task Force, October 2002.

The above documents are incorporated herein by reference in their entirety for all purposes.

In one embodiment, the nodes of example networks described herein are IP routers that implement multiprotocol label switching (MPLS) and operate as label switched routers (LSRs). In one simple MPLS scenario, at the ingress to the network, a label is assigned to each incoming packet based on its forwarding equivalence class before forwarding the packet to the next hop node. At each intermediate node, a forwarding selection and a new substitute label are determined by using the label found in the incoming packet as a reference to a label forwarding table that includes this information. At the network egress (or one hop prior), a forwarding decision is made based on the incoming label but optionally no label is included when the packet is sent on to the next hop.

The paths taken by packets that traverse the network in this manner are preconfigured and referred to as label switched paths (LSPs). Establishment of an LSP requires computation of a path, signaling along the path, and modification of forwarding tables along the path. MPLS Traffic Engineering establishes LSPs that have guaranteed bandwidth under certain conditions.

Embodiments of the present invention will be described with reference to two principal examples that involve computation of an optimal path which in the examples is the shortest path. The first example involves computing the path of an MPLS Traffic Engineering LSP through three Autonomous Systems. An Autonomous System (AS) is herein defined to be a group of routers within a network that are subject to a common authority and use the same intradomain routing protocol.

The second example involves computing the path of an MPLS Traffic Engineering LSP through three "areas." An area is a collection of routers that share full network topology information with each other but not necessarily with routers outside the area even those that with which they share common administrative control. The term area as used herein also encompasses the term "level" which has a similar meaning for networks that employ IS-IS as their IGP (interior gateway protocol). These examples are merely representative. Furthermore, the techniques described with reference to inter-AS path computation may be used in the context of inter-area path computation and, under certain conditions, the techniques described with reference to inter-area path computation may be used for inter-AS path computation.

Embodiments of the present invention provide a distributed path computation algorithm employing multiple path computation elements. Generally, there is one path computation element per AS or area used for the computation of specific LSP paths. The algorithm is herein referred to as the virtual shortest path tree (VSPT) algorithm. One implementation operates as a recursive backward path computation.

The following discussion of terminology and assumptions will refer to a multiple AS case but it will be understood that wherever Autonomous Systems are referred to, areas may be used also. The VSPT algorithm is applicable to tree-based multi-AS or multi-area topologies and can also be extended to arbitrary multi-AS topologies. This type of topology involves an arbitrary set of Autonomous Systems with the constraint that there is only one sequence of Autonomous Systems that connects any pair of Autonomous Systems.

A path computation element (PCE) is an entity having the capability to compute paths between any nodes in an AS and communicate with other path computation elements in other Autonomous Systems.

A path computation client (PCC) is a requesting entity, e.g., a label-switched router (LSR) that sends a path computation request to a path computation element. When a path computation element sends a request to another path computation element, it acts as a path computation client.

Now assume a topology with n Autonomous Systems: AS1, AS2, AS3, . . . ASn. Each AS has a dedicated path computation element PCEi which can either be statically configured on the path computation clients or dynamically discovered by means of IGP extensions. Also, the border routers that interconnect each AS will be defined. An entry border router of ASi is a border router that connects ASi−1 to ASi. An exit border router of ASi is a border router that interconnects ASi to ASi+1. In the case of areas rather than autonomous systems since the routers are under a common authority, a single router may in fact serve as the exit border router of one area and the entry border router of another area.

For each ASi, we can define a set, X-en(i), of entry border routers identified as ASBR-en(k,i), the kth entry border router of ASi. Similarly, there is a set X-ex(i) of exit border routers identified as ASBR-ex(k,i), the kth exit border router of ASI.

A virtual shortest path tree (VSPT) is established recursively by communication among the path computation elements. In one embodiment, at successive recursive stages a VSPTi is developed by PCEi and then transferred to PCEi−1. The VSPTi is rooted at the MPLS Traffic Engineering LSP destination or tail-end and extends to the entry border routers, ASBR-en($1,i$), ASBR-en($2,i$) . . . ASBR-en(X-en(i),i). The tree includes a path segment from each of these entry border routers to the tree root that is a shortest computed path that satisfies a set of constraints such as bandwidth, affinities, etc. Note that only entry border routers having connectivity to an exit border router of ASi−1 need be considered.

Figure 2:
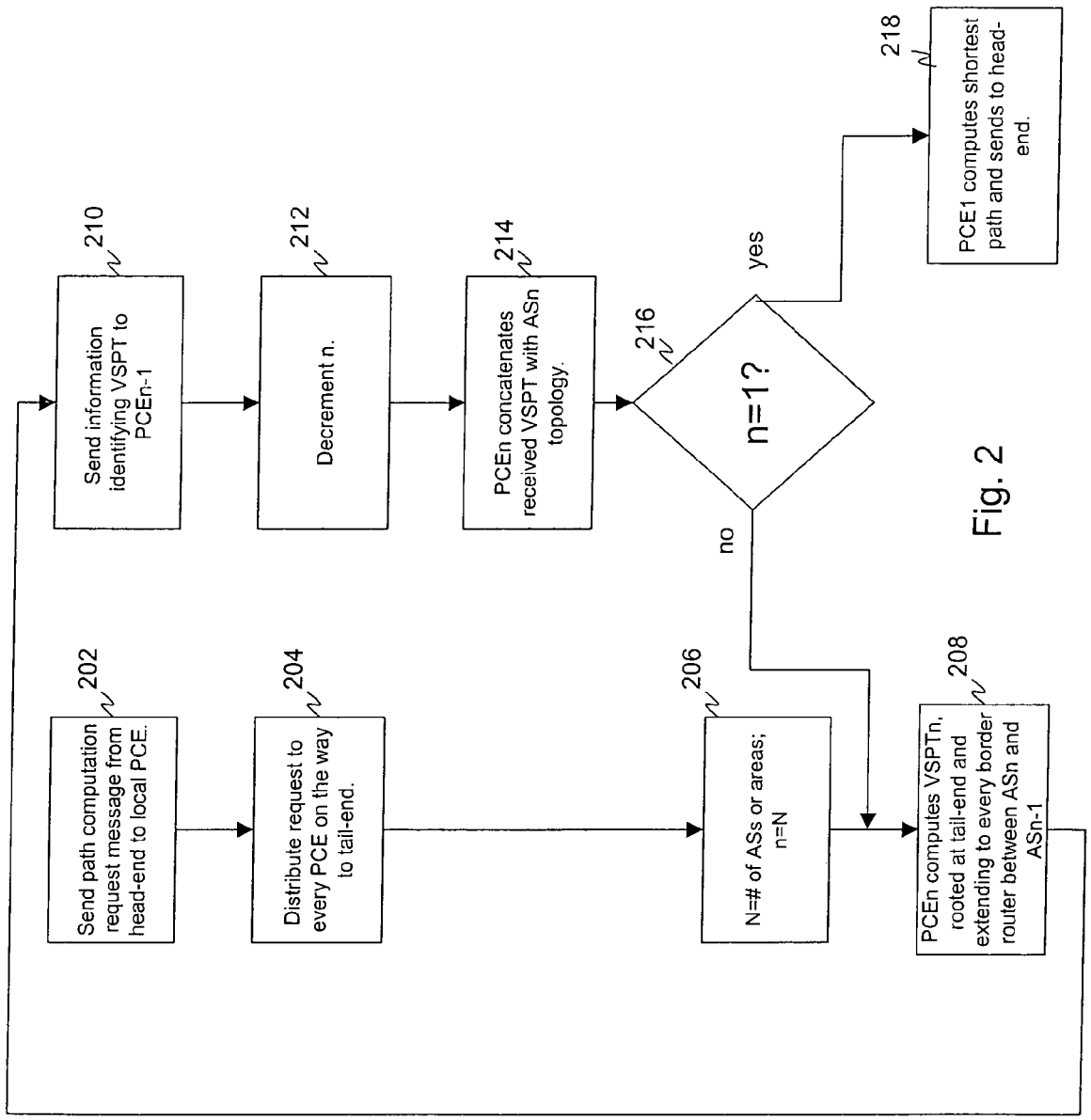
FIG. 2 is a flow chart describing steps of computing a path of an MPLS Traffic Engineering LSP across multiple Autonomous Systems according to one embodiment of the present invention.

FIG. 2 is a flow chart describing steps of computing a path of an inter-AS MPLS Traffic Engineering LSP according to one embodiment of the present invention. At a step 202, a path computation request is sent from the LSP head-end (which is acting as a path computation client) to the local path computation element. The address of the local path computation element may be manually configured. Alternatively, the path computation element may advertise itself through flooding within the area/AS. Path computation element discovery techniques can be in accordance with Lindem, et al., "Extensions to OSPF for Advertising Optional Router Capabilities," Internet Draft, Internet Engineering Task Force, October 2003 with Vasseur, et al., "OSPF Traffic Engineering Capability TLVs," Internet Draft, Internet Engineering Task Force, October 2002. The request can be made in accordance with a protocol specified in Vasseur, et al. "RSVP Path Computation Request and Reply Messages," Internet Draft, June 2002. At step 204, the path computation request is passed to the path computation element in every AS on the way to the LSP tail-end. Knowledge of the other path computation element addresses may be by way of static configuration or BGP advertisements as could be readily devised by one of skill in the art. N is the number of Autonomous Systems on the way to the LSP tail-end, one can say that the path computation request is ultimately received by a PCE-N in the AS of the tail-end.

A backward recursive path computation begins. A step 206 sets N to the number of Autonomous Systems and an index variable n is set equal to N. A step 208 is the first step inside the recursion loop. At step 208, PCEn computes VSPTn. VSPTn is a shortest path tree rooted at the LSP tail-end and includes a path from this tail-end to every ASBR-en(k,n). This may be computed using the CSPF (constrained shortest path first) algorithm as known in the art or any other suitable algorithm. Links between entry border routers of ASn should be taken into account when computing VSPTn. A step 210 sends information specifying VSPTn from PCEn to PCEn−1. The VPST may or may not be specified in such a way that hops internal to an AS and their costs are specified. A step 212 decrements n.

At step 214, PCEn concatenates the VSPT it received from PCEn+1 with the topology of ASn. In one implementation, PCEn, before concatenating the ASn topology with VSPTn+1 may invoke a local CSPF algorithm on the interconnections between all ASBR-ex(k,i) and ASBR-en(k',i+1). A step 216 tests whether n equals 1, i.e., whether the algorithm is about to visit the path computation element in the AS of the LSP head-end. If n does not equal 1, another iteration begins at step 208 with the computation of VSPTn.

If step 216 determines that n=1, then at step 218, PCE1 concatenates the received VSPT2 to the topology of AS1, computes (using, e.g., CSPF) the shortest path based on the concatenated topology, and then sends information specifying the shortest path to the requesting head-end. If multiple equal-cost paths are found, PCE1 may provide some or all of them to the requesting head-end. Other situations where PCE1 may return more than one path include, e.g., where the head-end requests the computation of N diverse paths. These diverse paths may or may not have equal costs.

A specific example of the application of the just-described procedure will be explained with reference to FIG. 1 and FIGS. 3A-3D. FIG. 1 depicts an inter-Autonomous System path computation scenario. There are three Autonomous Systems, AS1, AS2, and AS3. A path is to be computed between a head-end 102 in AS1 and a tail-end 104 in AS3. FIG. 1 shows 8 border routers positioned to connect the Autonomous Systems: AS1, AS2, . . . AS3. Additionally, FIG. 1 shows AS1 as including routers 106, 108, and 110, AS2 as including routers 112 and 114, and AS3 as including router 104 and 116.

All of the border routers are BGP (Border Gateway Protocol) peers. The protocols used for routing within an AS (e.g., an IGP), do not operate on the links connecting the border routers. Within an AS, an IGP protocol such as the well-known IS-IS or OSPF operates. ASBR1, ASBR8, and ASBR9 operate as path computation elements for their respective Autonomous Systems. All links have a cost of one. At least one path satisfying the set of required Traffic Engineering constraints (bandwidth, affinities, etc.) can be found between 1) the head-end 102 and every exit border router of AS1, 2) every entry border router of AS2 and every exit border router of AS2, and 3) every entry border router of AS3 and the destination.

Figure 3A:
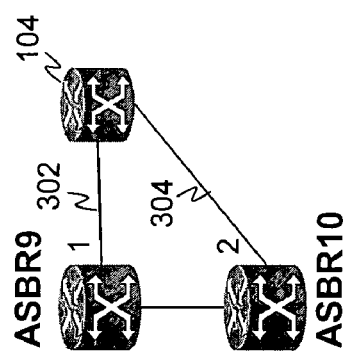
FIGS. 3A-3D depict evolution of a virtual shortest path tree across multiple Autonomous Systems according to one embodiment of the present invention.

The VSPT and shortest path is found as follows. A path computation request is sent from head-end 102 to ASBR1. ASBR1 is known as a path computation element to head-end 102 either by, e.g., static configuration or by use of an extension to the locally operative IGP protocol. The path computation request is relayed from ASBR1 to ASBR8 and then on to ASBR9. ASBR9 computes a VSPT3 interconnecting ASBR9 and ASBR10 with tail-end 104. This VSPT3 is depicted in FIG. 3A. Intermediate hops such as ones involving router 116 are omitted from the representation of VSPT3 to reflect their omission from the information specifying VSPT3 that is transmitted to ASBR2. VSPT3 includes a path 302 that includes one hop from ASBR9 to tail-end 104 and has a cost of 1. VSPT3 further includes a path 304 that includes hops from-ASBR10 to router 116 (not shown) on to tail-end 104. Path 304 has a cost of 2.

Figure 3B:
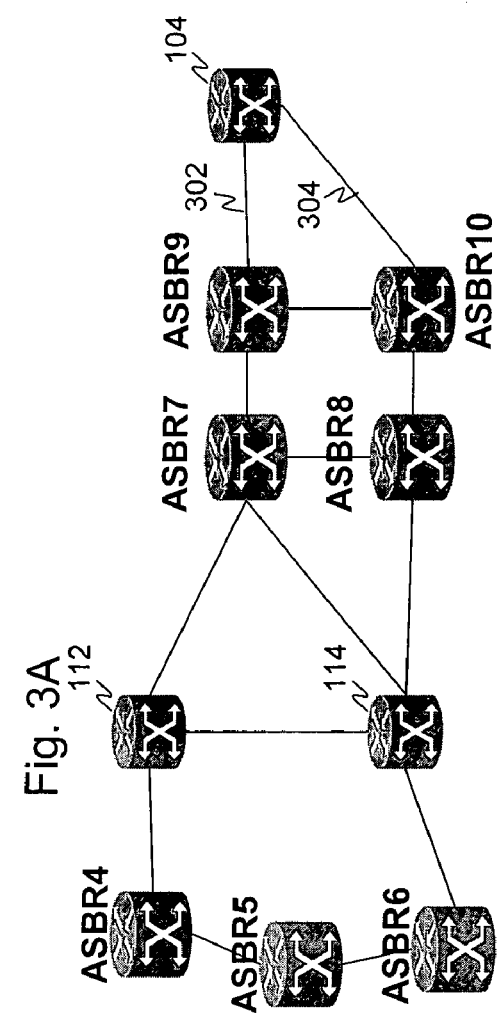
Figure 3C:
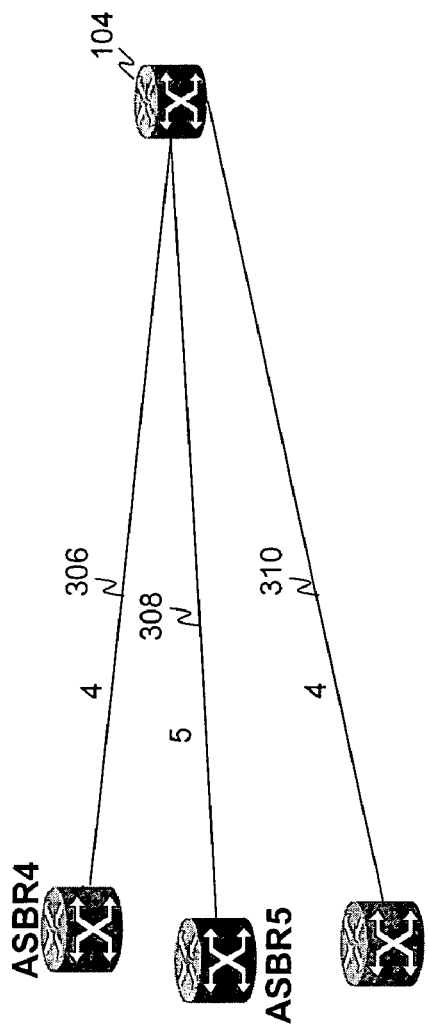

Upon receipt of VSPT3, ASBR8 concatenates the topology of AS2 with VSPT3 resulting in the mesh depicted in FIG. 3B. ASBR8 uses this topology to determine VSPT2 as shown in FIG. 3C. Only the costs and the endpoints are shown in FIG. 3C. A path 306 extends from ASBR4 through router 112, ASBR7, and ASBR9 to tail-end 104. A path 308 extends from ASBR5 through ASBR4, router 112, ASBR7, and ASBR9 to tail-end 104. A path 310 extends from ASBR6 through router 114, ASBR7, and ASBR9 to tail-end 104. Information specifying VSPT2 is sent to ASBR1.

Figure 3D:
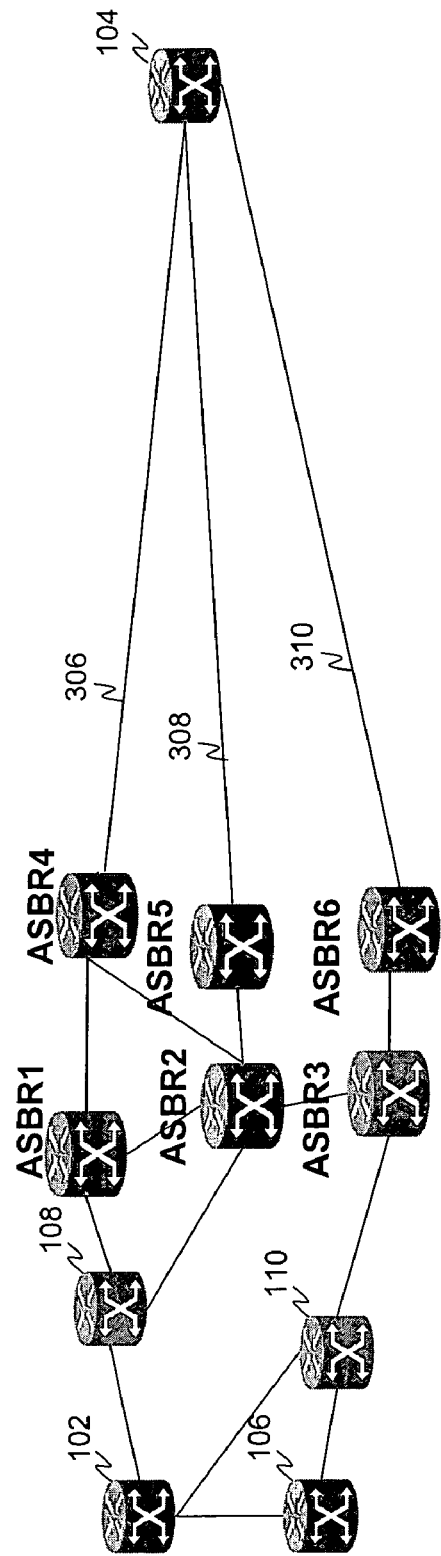

ASBR1 concatenates the topology of AS1 with VSPT2 to obtain a mesh shown in FIG. 3D. ASBR1 can then find a shortest path. Here there are multiple shortest paths having cost 7. One shortest path goes from head-end 102 through router 108, ASBR1, ASBR4, router 112, ASBR7, and ASBR9. Another shortest path traverses router 110, ASBR3, ASBR6, router 114, ASBR7, and ASBR9 before reaching tail-end 104. One or more of the shortest paths are reported to head-end 102.

Development of VSPTs and selection of the shortest path (s) involves comparing the costs of paths. Since links making up the paths may be in Autonomous Systems operated by different service providers, the metrics used for measuring cost may not be the same. There are various ways of addressing this issue. One way is to simply standardize the metric (e.g, the standard Traffic Engineering metric) among service providers that carry each other's MPLS Traffic Engineering LSPs. In an alternative implementation, a mapping mechanism is defined to translate costs in one metric to costs in another metric. For example, if cost is a function of only link bandwidth, tables correlating standard link bandwidth values (e.g., DS-1, DS-3, OC3, OC48, OC192) to local AS cost values could be passed among path computation elements. A PCEi that is transmitting VSPT information to PCEi−1 can use this type of table to translate cost information of the VSPT into the metric of PCEi−1 before transmitting. Alternatively, the translation could be performed by PCEi−1 prior to computing VSPTi−1.

The above-described techniques can also be applied to inter-area path computation rather than inter-AS path computation. It will often be the case that a single border router is directly connected in two areas and has access to IGP link information for both areas. In many common situations, the above-described VSPT development technique can be modified to reduce signaling.

Figure 4:
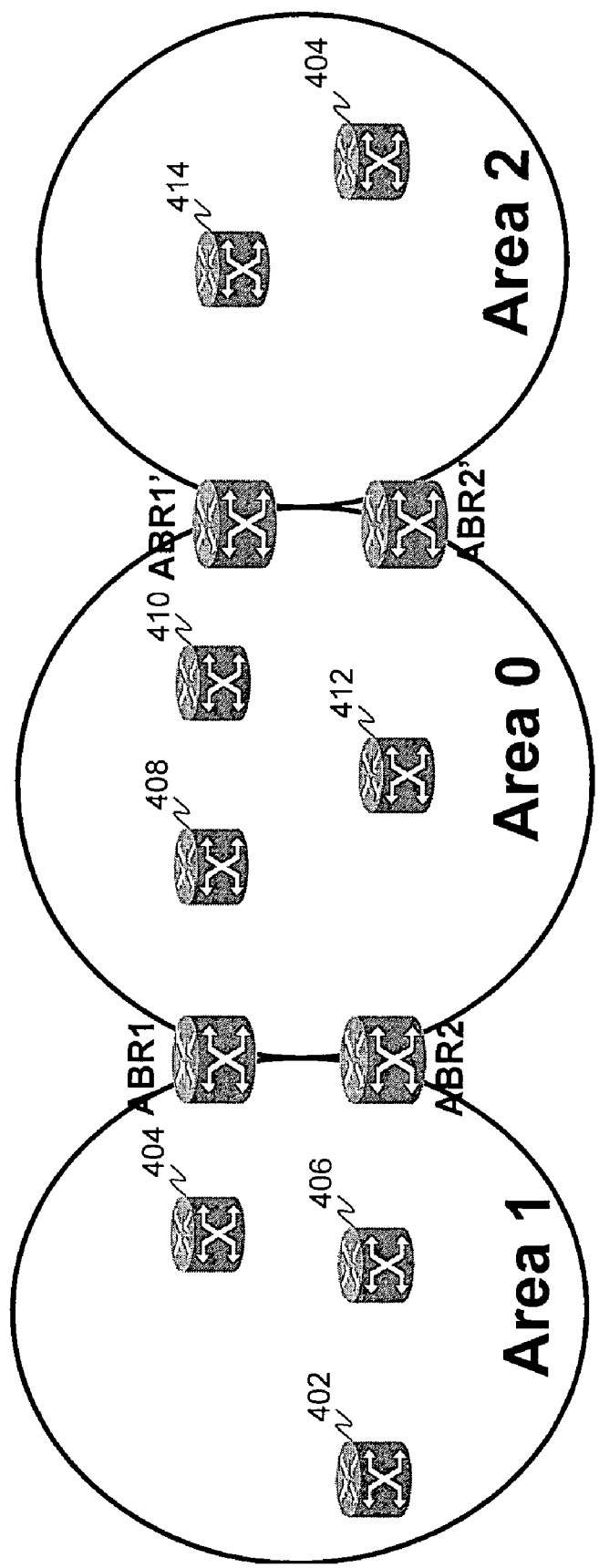
FIG. 4 depicts an inter-area path computation scenario according to one embodiment of the present invention.

FIG. 4 depicts an inter-area path computation scenario according to one embodiment of the present invention. There are three areas, Area 1, Area 0, and Area 2. The path of an MPLS Traffic Engineering LSP from a head-end 402 in Area 1 to a tail-end 404 in Area 2 is to be computed. Area border routers ABR1 and ABR2 interconnect Area 1 and Area 0. Area border routers ABR1' and ABR2' interconnect Area 0 and Area 2. Area 1 further includes routers 404 and 406. Area 0 further includes routers 408, 410, and 412. Area 2 further includes a router 414.

Figure 5:
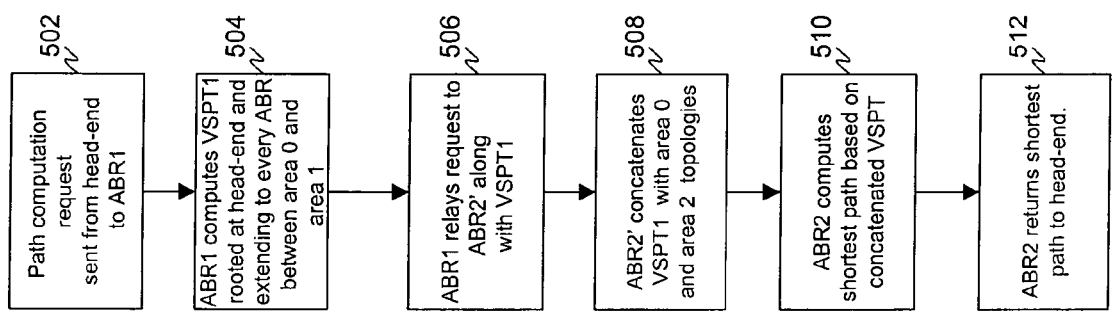
FIG. 5 is a flow chart describing steps of computing a path of an MPLS Traffic Engineering LSP across multiple areas according to one embodiment of the present invention.

FIG. 5 is a flow chart describing steps of computing a path of an MPLS Traffic Engineering LSP across multiple areas according to one embodiment of the present invention. At step 502, head-end 402 sends a path computation request to ABR1 to compute a path to tail-end 404. ABR1 computes shortest paths from head-end 402 to ABR1 and from head-end 402 to ABR2 at step 504. These shortest paths make up a VSPT1.

This VSPT1 is sent to ABR2' along with a path computation request at step 506. At step 508, ABR2' concatenates VSPT1 with the topologies of Area 0 and Area 2. Then at step 510, ABR2' computes a shortest path based on the concatenated topology. This shortest path is returned to head-end node 402 at step 512.

Figure 6:
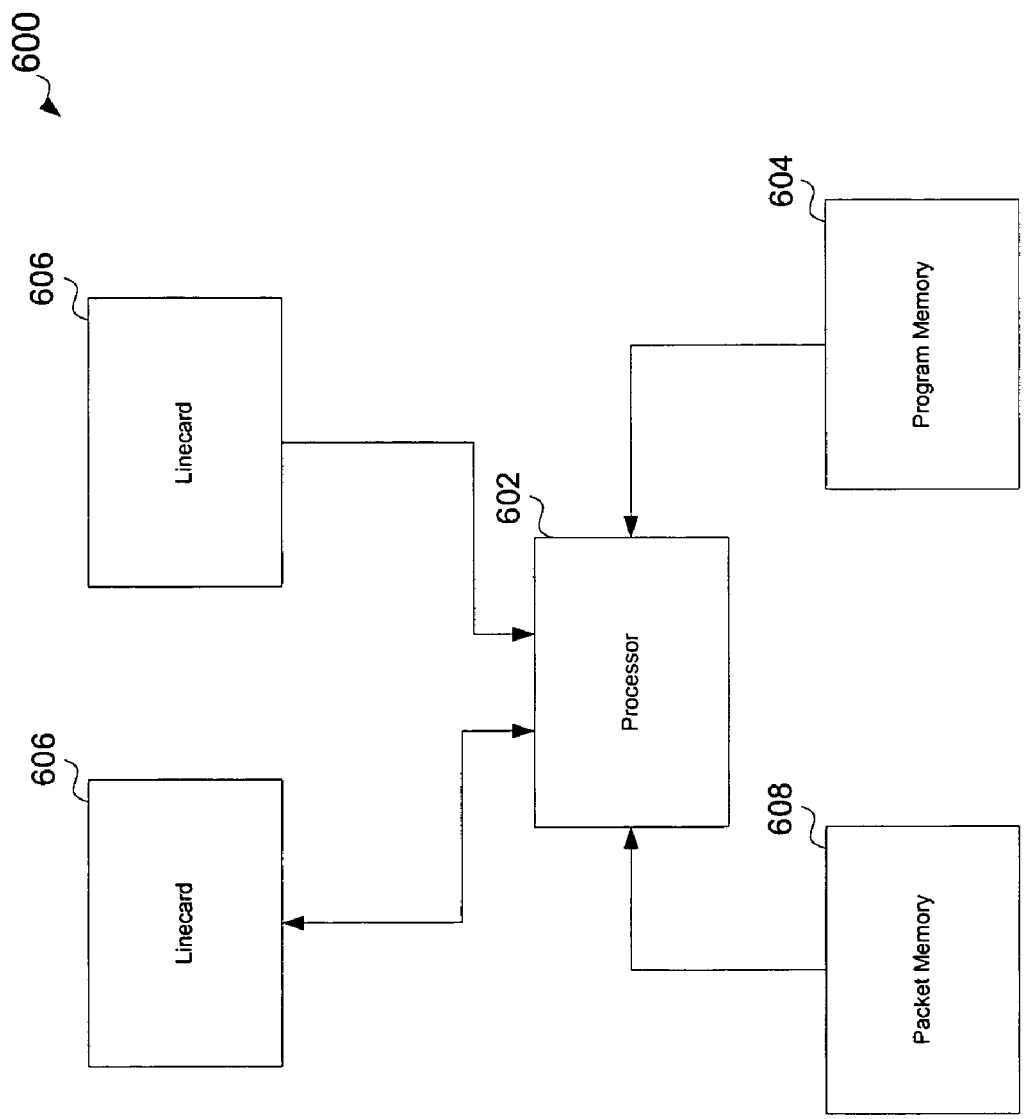
FIG. 6 depicts a network device suitable for implementing embodiments of the present invention.

FIG. 6 depicts a network device 600 that may be used to implement, e.g., any of the routers of FIG. 1, FIGS. 3A-3D, or FIG. 4 and/or perform any of the steps of FIG. 2 or FIG. 5. In one embodiment, network device 600 is a programmable machine that may be implemented in hardware, software or any combination thereof. A processor 602 executes code stored in a program memory 604. Program memory 604 is one example of a computer-readable medium. Program memory 604 can be a volatile memory. Another form of computer-readable medium storing the same codes would be some type of non-volatile storage such as floppy disks, CD-ROMs, DVD-ROMs, hard disks, flash memory, etc.

Network device 600 interfaces with physical media via a plurality of linecards 606. Linecards 606 may incorporate Ethernet interfaces, DSL interfaces, Gigabit Ethernet interfaces, 10-Gigabit Ethernet interfaces, SONET interfaces, etc. As packets are received, processed, and forwarded by network device 600, they may be stored in a packet memory 608. Network device 600 implements all of the network protocols and extensions thereof described above as well as the data networking features provided by the present invention.

In one implementation, control plane operations such as the path computation operations described above are controlled and signaled by processor 602 while forwarding tables are maintained on linecards 606. The present invention is, however, not limited to a distributed architecture. To implement functionality according to the present invention, linecards 606 may incorporate processing and memory resources similar to those discussed above in connection with the network device as a whole.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A method for operating a first path computation element in a first autonomous system to participate in establishing an inter-autonomous system Multi-Protocol Label Switching (MPLS) Traffic Engineering Label Switched Path (LSP) between a head-end node and a tail-end node, said method comprising:
   receiving at said first path computation element, virtual shortest path tree information from a second path computation element in a second autonomous system, said virtual shortest path tree information identifying a virtual shortest path tree rooted at said tail-end node and extending to one or more border routers linking said first autonomous system and said second autonomous system;
   performing computations at said first path computation element, based on said received virtual shortest path tree information to determine a revised virtual shortest path tree, said revised virtual shortest path tree extending from said tail-end node to one or more border routers linking said first autonomous system and a third autonomous system; and
   sending information identifying said revised virtual shortest path tree from said first path computation element to a third path computation element in said third autonomous system;
   wherein said revised virtual shortest path tree is used to compute a path of said MPLS Traffic Engineering LSP between said head-end node and said tail-end node.

2. The method of claim 1 wherein said information identifying said revised virtual shortest path tree identifies paths through said one or more border routers linking said first autonomous system and said third autonomous system without identifying intermediate nodes between said one or more border routers linking said first autonomous system and said third autonomous system.

3. The method of claim 2 wherein said information identifying said revised virtual shortest path tree identifies paths through said one or more border routers linking said first autonomous system and said third autonomous system and identifies intermediate nodes between said border routers linking said first autonomous system and said third autonomous system.

4. The method of claim 1 further comprising:
   prior to receiving said virtual shortest path tree information from said second path computation element, receiving a path computation request from said third path computation element and forwarding said request to said second path computation element.

5. The method of claim 1 wherein said tail-end node is in said second autonomous system.

6. The method of claim 1 wherein said head-end node is in said third autonomous system.

7. A method for operating a first path computation element in a first autonomous system to participate in establishing a Multi-Protocol Label Switching (MPLS) Traffic Engineering Label Switched Path (LSP) from a head-end node in said first autonomous system to a tail-end node in a second autonomous system, said method comprising:
   receiving at said first path computation element, a path computation request from said head-end node;
   transmitting at said first path computation element, said path computation request to a second path computation element in a third autonomous system bordering said first autonomous system; and thereafter
   receiving at said first path computation element, virtual shortest path tree information from said second path computation element, said virtual shortest path tree information identifying a virtual shortest path tree rooted at said tail-end node in said second autonomous system and extending to one or more border routers connected in both said first autonomous system and said third autonomous system;
   wherein said virtual shortest path tree information is used to compute a path of said MPLS Traffic Engineering LSP from said head-end node to said tail-end node.

8. The method of claim 7 further comprising:
   sending information identifying said computed path to said head-end node.

9. The method of claim 8 wherein said information identifying said computed path identifies said one or more border routers connected in both of said first autonomous system and said third autonomous system without identifying intermediate nodes between said one or more border routers connected in both said first autonomous system and said third autonomous system.

10. The method of claim 8 wherein said information identifying said computed path identifies said one or more border routers connected in both of said first autonomous system and said third autonomous system and intermediate nodes between said one or more border routers connected in both of said first autonomous system and said third autonomous system.

11. A method for operating a first path computation element in a first area to participate in establishing a Multi-Protocol Label Switching (MPLS) Traffic Engineering Label Switched Path (LSP) from a head-end node in said first area to a tail-end node in a second area, said method comprising:
   computing at said first path computation element a virtual shortest path tree rooted at said head-end node and extending to one or more border routers connected to said first area and to a third area; and
   sending information identifying said virtual shortest path tree from said first path computation element to a second path computation element operating on a border router connected in both said third area and said second area;
   wherein said virtual shortest path tree information is used to compute a path of said MPLS Traffic Engineering LSP from said head-end node to said tail-end node.

12. The method of claim 11 further comprising:
   receiving information identifying a path of said Traffic Engineering LSP from said second path computation element; and
   notifying said head-end node.

13. The method of claim 11 wherein said first path computation element operates on said one or more border routers connected in both said first area and said third area.

14. A method for operating a first path computation element connected in a first area and a second area to participate in establishing a Multi-Protocol Label Switching (MPLS) Traffic Engineering Label Switched Path (LSP) from a head-end node in a third area to a tail-end node in said first area, said method comprising:
   receiving at said first path computation element, information identifying a virtual shortest path tree rooted at said head-end node and extending to one or more border routers connected in both said third area and said second area;
   performing at said first path computation element, computations to extend said virtual shortest path tree through said second area and said third area; and
   identifying at said first path computation element, a path for said MPLS Traffic Engineering LSP based on said extended virtual shortest path tree.

15. The method of claim 14 wherein receiving comprises:
   receiving said information identifying said virtual shortest path tree from a second path computation element connected in both said second area and said third area.

16. The method of claim 14 further comprising:
   sending information identifying said path for said Traffic Engineering LSP to said head-end node.

17. A method for operating a first path computation element in a first area to participate in establishing an inter-area Multi-Protocol Label Switching (MPLS) Traffic Engineering Label Switched Path (LSP) between a head-end node and a tail-end node, said method comprising:
   receiving at said first path computation element, virtual shortest path tree information from a second path computation element in a second area, said virtual shortest path tree information identifying a virtual shortest path tree rooted at said tail-end node and extending to one or more border routers linking said first area and said second area;
   performing at said first path computation element, computations based on said received virtual shortest path tree information to determine a revised virtual shortest path tree, said revised virtual shortest path tree extending from said tail-end node to one or more border routers linking said first area and a third area; and
   sending information identifying said revised virtual shortest path tree from said first path computation element to a third path computation element in said third area;
   wherein said revised virtual shortest path tree is used to compute a path of said MPLS Traffic Engineering LSP between said head-end node and said tail-end node.

18. The method of claim 17 wherein said information identifying said revised virtual shortest path tree identifies paths through said one or more border routers linking said first area and said third area without identifying intermediate nodes between said border routers linking said first area and said third area.

19. The method of claim 18 wherein said information identifying said revised virtual shortest path tree identifies paths through said one or more border routers linking said first area and said third area and identifies intermediate nodes between said border routers linking said first area and said third area.

20. The method of claim 19 further comprising:
   prior to receiving said virtual shortest path tree information from said second path computation element, receiving a path computation request from said third path computation element and forwarding said request to said second path computation element.

21. A method for operating a first path computation element in a first area to participate in establishing a Multi-Protocol Label Switching (MPLS) Traffic Engineering Label Switched Path (LSP) from a head-end node in said first area to a tail-end node in a second area, said method comprising:
   receiving at said first path computation element, a path computation request from said head-end node;
   transmitting at said first path computation element, said path computation request to a second path computation element in a third area bordering said first area; and thereafter
   receiving at said first path computation element, virtual shortest path tree information from said second path computation element, said virtual shortest path tree information identifying a virtual shortest path tree rooted at said tail-end node in said second area and extending to one or more border routers connected in both said first area and said third area;
   wherein said virtual shortest path tree information is used to compute a path of said MPLS Traffic Engineering LSP from said head-end node to said tail-end node.

22. The method of claim 21 further comprising:
   sending information identifying said computed path of said Traffic Engineering LSP to said head-end node.

23. The method of claim 22 wherein said information identifying said computed path identifies border routers of said path without identifying intermediate nodes between said border routers.

24. The method of claim 22 wherein said information identifying said computed path identifies border routers of said path and intermediate nodes between said border routers.

25. A computer-readable medium storing executable codes for operating a first path computation element in a first autonomous system to participate in establishing an inter-autonomous system Multi-Protocol Label Switching (MPLS) Traffic Engineering Label Switched Path (LSP) between a head-end node and a tail-end node, comprising:
   code that causes receipt of virtual shortest path tree information from a second path computation element in a second autonomous system, said virtual shortest path tree information identifying a shortest path tree rooted at said tail-end and extending to one or more border routers linking said first autonomous system and said second autonomous system;

code that causes performance of computations based on said received virtual shortest path tree information to determine a revised virtual shortest path tree, said revised virtual shortest path tree extending from said tail-end node to one or more border routers linking said first autonomous system and a third autonomous system; and code that causes sending of information identifying said revised virtual shortest path tree to a third path computation element in said third autonomous system;

wherein said revised virtual shortest path tree is used to compute a path of said MPLS Traffic Engineering LSP between said head-end node and said tail-end node.

26. The computer-readable medium of claim 25 wherein said information identifying said revised virtual shortest path tree identifies paths through border routers of said revised virtual shortest path tree without identifying intermediate nodes between said border routers linking said first autonomous system and said third autonomous system.

27. The computer-readable medium of claim 26 wherein said information identifying said revised virtual shortest path tree identifies paths through border routers of said revised virtual shortest path tree and identifies intermediate nodes between said border routers linking said first autonomous system and said third autonomous system.

28. The computer-readable medium of claim 25 further comprising:
code that, prior to receipt of said virtual shortest path tree information from said second path computation element, causes receipt of a path computation request from said third path computation element and forwarding said request to said second path computation element.

29. A computer-readable medium storing executable codes for operating a first path computation element in a first autonomous system to participate in establishing a Multi-Protocol Label Switching (MPLS) Traffic Engineering Label Switched Path (LSP) from a head-end node in said first autonomous system to a tail-end node in a second autonomous system, comprising:
code that causes receipt of a path computation request from said head-end node;
code that causes transmission of said path computation request to a second path computation element in a third autonomous system bordering said first autonomous system; and
code that causes receipt of virtual shortest path tree information from said second path computation element, said virtual shortest path tree information identifying a virtual shortest path tree rooted at said tail-end node and extending to one more border routers connected in both said first autonomous system and said third autonomous system;
wherein said virtual shortest path tree information is used to compute a path of said MPLS Traffic Engineering LSP from said head-end node to said tail-end node.

30. The computer-readable medium of claim 29 further comprising:
code that causes sending of information identifying said computed path to said head-end node.

31. The computer-readable medium of claim 30 wherein said information identifying said computed path identifies border routers of said path without identifying intermediate nodes between said border routers.

32. The computer-readable medium of claim 30 wherein said information identifying said computed path identifies border routers of said path and intermediate nodes between said border routers.

33. A computer-readable medium storing executable codes for operating a first path computation element in a first area to participate in establishing a Multi-Protocol Label Switching (MPLS) Traffic Engineering Label Switched Path (LSP) from a head-end node in said first area to a tail-end node in a second area, comprising:
code that causes computation of a virtual shortest path tree rooted at said head-end node and extending to one or more border routers connected to said first area and to a third area; and
code that causes sending of information identifying said virtual shortest path tree to a second path computation element operating on a border router connected in both said third area and said second area;
wherein said virtual shortest path tree information is used to compute a path of said MPLS Traffic Engineering LSP from said head-end node to said tail-end node.

34. The computer-readable medium of claim 33 further comprising:
code that causes receipt of information identifying a path of said Traffic Engineering LSP from said second path computation element; and
code that causes notification of said head-end node of said path.

35. The computer-readable medium of claim 33 wherein said first path computation element operates on a border router connected in both said first area and said third area.

36. A computer-readable medium storing executable codes for operating a first path computation element connected in a first area and a second area to participate in establishing a Multi-Protocol Label Switching (MPLS) Traffic Engineering Label Switched Path (LSP) from a head-end node in a third area to a tail-end node in said first area, comprising:
code that causes receipt of information identifying a virtual shortest path tree rooted at said head-end node and extending to one or more border routers connected in both said third area and said second area;
code that causes performance of computations to extend said virtual shortest path tree through said second area and said third area; and
code that causes identification of a path for said MPLS Traffic Engineering LSP based on said extended virtual shortest path tree.

37. The computer-readable medium of claim 36 wherein said code that causes receipt comprises:
code that causes receipt of said information from a second path computation element connected in both said second area and said third area.

38. The computer-readable medium of claim 36 further comprising:
code that causes sending of information identifying said path to said head-end node.

39. A computer-readable medium storing computer codes for operating a first path computation element in a first area to participate in establishing an inter-area Multi-Protocol Label Switching (MPLS) Traffic Engineering Label Switched Path (LSP) between a head-end node and a tail-end node, comprising:
code that causes receipt of virtual shortest path tree information from a second path computation element in a second area, said virtual shortest path tree information identifying a shortest path tree rooted at said tail-end node and extending to one or more border routers linking said first area and said second area;

code that causes performance of computations based on said received virtual shortest path tree information to determine a revised virtual shortest path tree, said revised virtual shortest path tree extending from said tail-end node to one or more border routers linking said first area and a third area; and code that causes sending of information identifying said revised virtual shortest path tree to a third path computation element in said third area;

wherein said revised virtual shortest path tree is used to compute a path of said MPLS Traffic Engineering LSP between said head-end node and said tail-end node.

40. The computer-readable medium of claim 39 wherein said information identifying said revised virtual shortest path tree identifies paths through border routers linking said first area and said third area without identifying intermediate nodes between said border routers linking said first area and said third area.

41. The computer-readable medium of claim 40 wherein said information identifying said revised virtual shortest path tree identifies paths through border routers linking said first area and said third area and identifies intermediate nodes between said border routers linking said first area and said third area.

42. The computer-readable medium of claim 39 further comprising:

code that, prior to receipt of said virtual shortest path tree information from said second path computation element, causes receipt of a path computation request from said third path computation element and forwarding said request to said second path computation element.

43. A computer-readable medium storing executable codes for operating a first path computation element in a first area to participate in establishing a Multi-Protocol Label Switching (MPLS) Traffic Engineering Label Switched Path (LSP) from a head-end node in said first area to a tail-end node in a second area, comprising:

code that causes receipt of a path computation request from said head-end node;

code that causes transmission of said path computation request to a second path computation element in a third area bordering said first area; and code that causes receipt of virtual shortest path tree information from said second path computation element, said virtual shortest path tree information identifying a virtual shortest path tree rooted at said tail-end node and extending to one more border routers connected in both said first area and said third area;

wherein said virtual shortest path tree information is used to compute a path of said MPLS Traffic Engineering LSP from said head-end node to said tail-end node.

44. The computer-readable medium of claim 43 further comprising:

code that causes sending of information identifying said computed path to said head-end node.

45. The computer-readable medium of claim 44 wherein said information identifying said path identifies border routers of said computed path without identifying intermediate nodes between said border routers.

46. The computer-readable medium of claim 44 wherein said information identifying said path identifies border routers of said computed path and intermediate nodes between said border routers.

47. Apparatus for operating a first path computation element in a first autonomous system to participate in establishing an inter-autonomous system Multi-Protocol Label Switching (MPLS) Traffic Engineering Label Switched Path (LSP) between a head-end node and a tail-end node, said method comprising:

means for receiving at the first path computation element, virtual shortest path tree information from a second path computation element in a second autonomous system, said virtual shortest path tree information identifying a virtual shortest path tree rooted at said tail-end node and extending to one or more border routers linking said first autonomous system and said second autonomous system;

means for performing computations at the first path computation element, based on said received virtual shortest path tree information to determine a revised virtual shortest path tree, said revised virtual shortest path tree extending from said tail-end node to one or more border routers linking said first autonomous system and a third autonomous system; and means for sending information identifying said revised virtual shortest path tree from the first path computation element to a third path computation element in said third autonomous system;

wherein said revised virtual shortest path tree is used to compute a path of said MPLS Traffic Engineering LSP between said head-end node and said tail-end node.

48. Apparatus for operating a first path computation element in a first autonomous system to participate in establishing a Multi-Protocol Label Switching (MPLS) Traffic Engineering Label Switched Path (LSP) from a head-end node in said first autonomous system to a tail-end node in a second autonomous system, said method comprising:

means for receiving at the first path computation element, a path computation request from said head-end node;

means for transmitting at the first path computation element, said path computation request to a second path computation element in a third autonomous system bordering said first autonomous system; and means for receiving at the first path computation element, virtual shortest path tree information from said second path computation element, said virtual shortest path tree information identifying a virtual shortest path tree rooted at said tail-end node in said second autonomous system and extending to one or more border routers connected in both said first autonomous system and said third autonomous system;

wherein said virtual shortest path tree information is used to compute a path of said MPLS Traffic Engineering LSP from said head-end node to said tail-end node.

49. Apparatus for operating a first path computation element in a first area to participate in establishing an inter-area Multi-Protocol Label Switching (MPLS) Traffic Engineering Label Switched Path (LSP) between a head-end node and a tail-end node, said method comprising:

means for receiving at said first path computation element, virtual shortest path tree information from a second path computation element in a second area, said virtual shortest path tree information identifying a virtual shortest path tree rooted at said tail-end node and extending to one or more border routers linking said first area and said second area;

means for performing computations at said first path computation element, based on said received virtual shortest path tree information to determine a revised virtual shortest path tree, said revised virtual shortest path tree extending from said tail-end node to one or more border routers linking said first area and a third area; and means for sending information identifying said revised virtual shortest path tree from said first path computation element to a third path computation element in said third area;

wherein said revised virtual shortest path tree is used to compute a path of said MPLS Traffic Engineering LSP between said head-end node and said tail-end node.

50. Apparatus for operating a first path computation element in a first area to participate in establishing a Multi-Protocol Label Switching (MPLS) Traffic Engineering Label Switched Path (LSP) from a head-end node in said first area to a tail-end node in a second area, said method comprising:

means for receiving at said first path computation element, a path computation request from said head-end node;

means for transmitting at said first path computation element, said path computation request to a second path computation element in a third area bordering said first area; and means for receiving at said first path computation element, virtual shortest path tree information from said second path computation element, said virtual shortest path tree information identifying a virtual shortest path tree rooted at said tail-end node in said second area and extending to one or more border routers connected in both said first area and said third area, said virtual shortest path tree rooted at the Traffic Engineering said LSP tail-end node;

wherein said virtual shortest path tree information is used to compute a path of said MPLS Traffic Engineering LSP from said head-end node to said tail-end node.

51. Apparatus for operating a first path computation element in a first autonomous system to participate in establishing an inter-autonomous system Multi-Protocol Label Switching (MPLS) Traffic Engineering Label Switched Path (LSP) between a head-end node and a tail-end node, said method comprising:

a processor; and a memory device that stores instructions to be executed by the processor, said instructions comprising:

code that causes receipt at the first path computation element, of virtual shortest path tree information from a second path computation element in a second autonomous system, said virtual shortest path tree information identifying a virtual shortest path tree rooted at said tail-end node and extending to one or more border routers linking said first autonomous system and said second autonomous system;

code that causes performance of computations based on said received virtual shortest path tree information to determine a revised virtual shortest path tree, said revised virtual shortest path tree extending from said tail-end node to one or more border routers linking said first autonomous system and a third autonomous system; and code that causes sending information identifying said revised virtual shortest path tree to a third path computation element in said third autonomous system;

wherein said revised virtual shortest path tree is used to compute a path of said MPLS Traffic Engineering LSP between said head-end node and said tail-end node.

52. The apparatus of claim 51 wherein said information identifying said revised virtual shortest path tree identifies paths through said one or more border routers linking said first autonomous system and said third autonomous system tree without identifying intermediate nodes between said border routers linking said first autonomous system and said third autonomous system.

53. The apparatus of claim 51 wherein said information identifying said revised virtual shortest path tree identifies paths through said one or more border routers linking said first autonomous system and said third autonomous system and identifies intermediate nodes between said one or more border routers linking said first autonomous system and said third autonomous system.

54. Apparatus for operating a first path computation element in a first autonomous system to participate in establishing a Multi-Protocol Label Switching (MPLS) Traffic Engineering Label Switched Path (LSP) from a head-end node in said first autonomous system to a tail-end node in a second autonomous system, said product comprising:

a processor; and a memory device that stores instructions to be executed by the processor, said instructions comprising:

code that causes receipt at the first path computation element, of a path computation request from said head-end node;

code that causes transmission of said path computation request to a second path computation element in a third autonomous system bordering said first autonomous system; and code that causes receipt of virtual shortest path tree information from said second path computation element, said virtual shortest path tree information identifying a virtual shortest path tree rooted at said tail-end node in said second autonomous system and extending to one more border routers connected in both said first autonomous system and said third autonomous system;

wherein said virtual shortest path tree information is used to compute a path of said MPLS Traffic Engineering LSP from said head-end node to said tail-end node.

55. The apparatus of claim 54 further comprising code that causes use of said virtual shortest path tree information to compute a path of said Traffic Engineering LSP from said head-end node to said tail-end node.

56. The apparatus of claim 54 further comprising code that causes sending of said virtual shortest path tree information to said head-end node.

* * * * *

UNITED STATES PATENT AND TRADEMARK OFFICE
CERTIFICATE OF CORRECTION

PATENT NO. : 7,599,349 B2  Page 1 of 1
APPLICATION NO. : 10/767574
DATED : October 6, 2009
INVENTOR(S) : Vasseur et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1242 days.

Signed and Sealed this

Twenty-eighth Day of September, 2010

David J. Kappos
*Director of the United States Patent and Trademark Office*